W. A. RUSH.
COTTON CHOPPER.
APPLICATION FILED MAY 2, 1908.

921,167.

Patented May 11, 1909.
2 SHEETS—SHEET 1.

Witnesses
E. L. Armstrong
E. L. Chandlee

Inventor
W. A. Rush
By Woodward & Chandlee
Attorneys

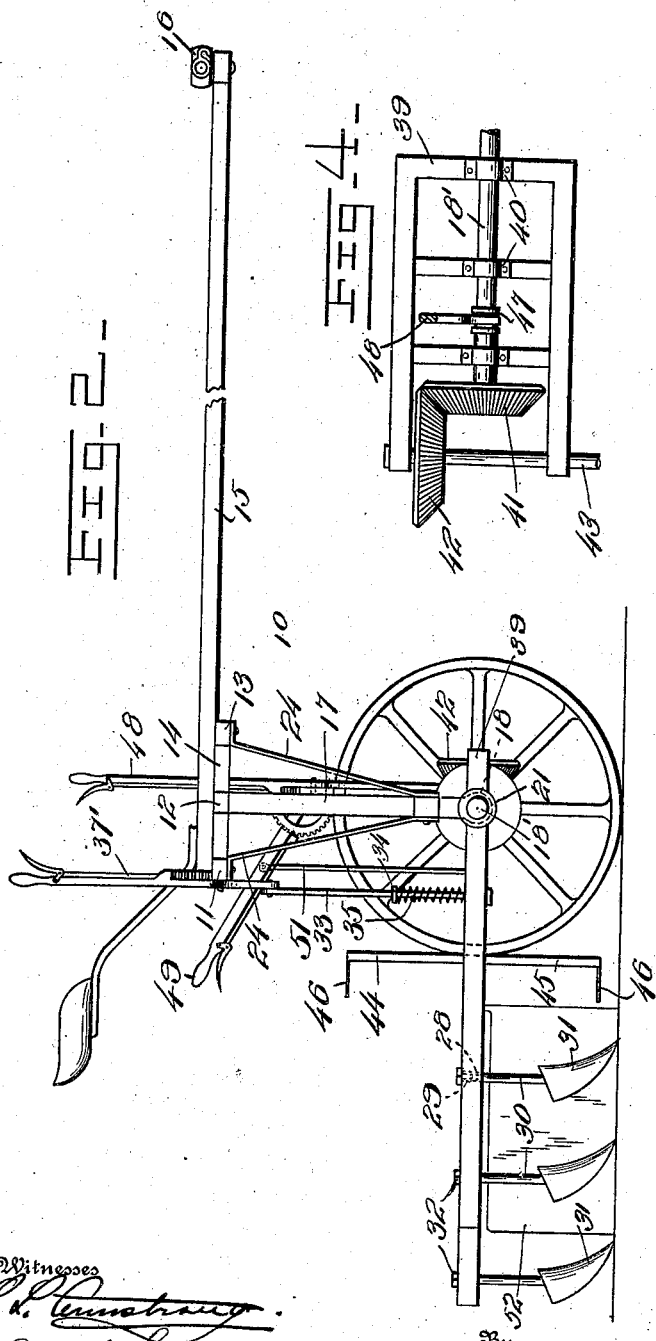

UNITED STATES PATENT OFFICE.

WILLARD A. RUSH, OF ROME, GEORGIA.

COTTON-CHOPPER.

No. 921,167.　　　Specification of Letters Patent.　　　Patented May 11, 1909.

Application filed May 2, 1908. Serial No. 430,544.

*To all whom it may concern:*

Be it known that I, WILLARD A. RUSH, a citizen of the United States, residing at Rome, in the county of Floyd and State of Georgia, have invented certain new and useful Improvements in Cotton-Choppers, of which the following is a specification.

This invention relates to combined cotton choppers and cultivators, and has for an object to provide a machine of this character which will be simple and durable in construction and which will be adapted for cultivating cotton plants, and thinning out the rows.

Other objects and advantages will be apparent from the following description and it will be understood that changes in the specific structure shown and described may be made within the scope of the claims without departing from the spirit of the invention.

Figure 1:
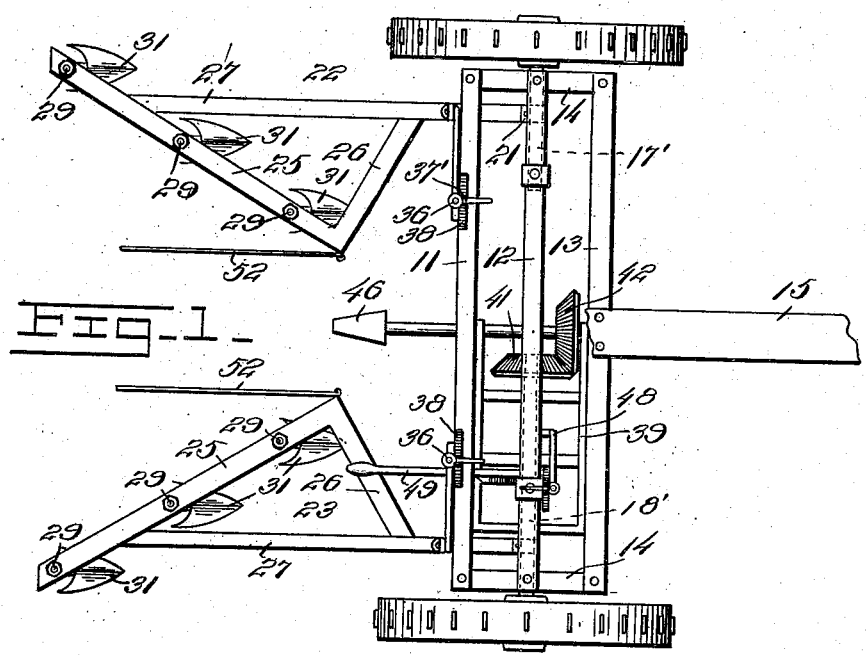
Figure 3:
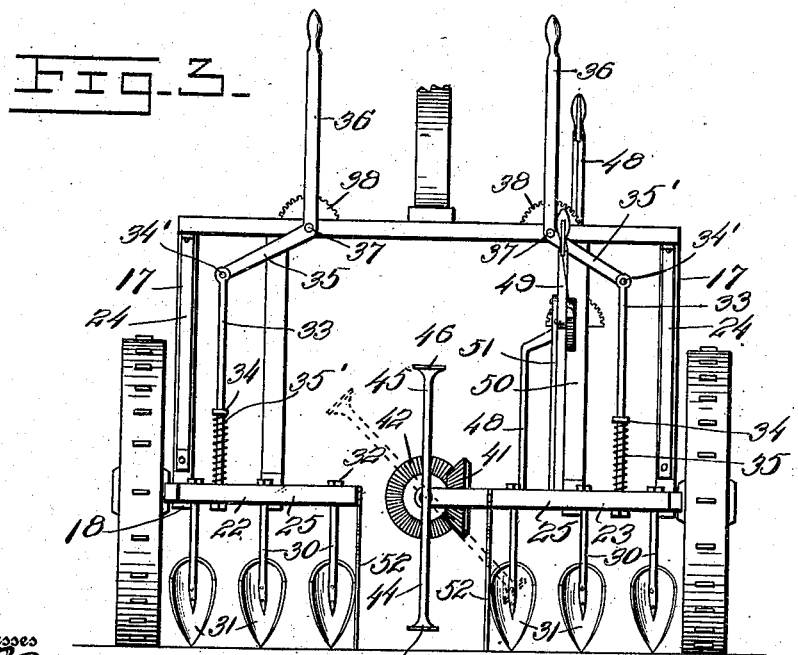

In the drawings forming a portion of this specification, and in which like numerals of reference indicate similar parts in the several views. Figure 1 is a top plan view, the seat and a portion of the pole being omitted. Fig. 2 is a side elevational view. Fig. 3 is a rear elevation. Fig. 4 is a plan view of the clutch mechanism, parts shown engaged.

Referring now more particularly to the drawings, there is shown a combined cotton chopper and cultivator 10 comprising transversely extending parallel spaced members 11, 12 and 13 respectively connected by end members 14. The transversely extending members receive thereupon a draft pole 15 provided at its front end with suitable draft connections 16. The member 12 is provided at its ends with depending standards 17, which carry journal boxes 18 at their lower ends. These boxes receive wheel straps 17' and 18' which have straps 21 pivotally engaged therewith, these straps being connected to harrow frames 22 and 23 respectively, so that the frames are movable vertically. The standards 17 are braced by diagonal members 24 which are connected at their upper ends to the parallel spaced members 11 and 13 respectively.

Each of the frames 22 and 23 respectively consists of members 25 and 26 respectively extending at right angles to each other, and connected by a forwardly and rearwardly extended member 27 attached at its forward end to the strap 41. The angularly disposed portions 25 of the frames extend in rearwardly divergent relation to each other and are provided with vertical passages 28 for the reception of reduced portions 29 of depending shanks 30 which carry at their lower ends harrow shovels 31. The reduced portions of the shanks are threaded, and thus receive clamping nuts 32. Each frame is provided with a vertically disposed rod 33 each of which is provided with a fixed collar 34 the end thus receiving a spring 35 confined between the collar and its respective frame. The upper end of each rod 33 is pivotally connected as shown at 34' to an angularly disposed portion 35' of a bell crank lever 36 which is pivotally connected as shown at 37 to the member 11. Each bell crank lever is provided with a suitable dog 37' for engagement with a rack 38 carried by the member 11. It will thus be seen that each harrow frame is pivotally connected to the shafts 17' and 18' and are arranged for movement in a vertical plane as will be readily understood.

The shaft 18', is having a frame 39 provided with boxes 40 which are engaged with the shaft so that the frame is pivotally mounted upon the shaft, and at the inner end, the shaft 18' carries a slidably bevel pinion 41 for engagement with a pinion 42 carried by a longitudinal shaft 43 journaled in members of the frame 39 as shown in Fig. 4 of the drawings. The shaft 43, at its rearward end is provided with radial arms 44 and 45 respectively, each of which is provided with a cutting hoe 46. A grooved member 47 is carried by the gear 41 and is controlled by a lever 48 whereby the gear 41 may be moved into and out of mesh with the gear 42.

A lever 49 is pivotally connected to a depending beam 50 carried by the member 12, and this lever carries a link 51 which is connected at its lower end with the frame 39 and is arranged for rocking movement of the frame upon the shaft 18' so that the cutting hoes 46 may be moved into and out of engagement with the ground at the will of the operator.

It will thus be seen that each harrow section is yieldingly mounted and may be raised and lowered to suit different occasions as is obvious, and should the shovels of the sections come in contact with rocks or similar obstructions it will be seen that the springs 35 provide means whereby the sections may be moved in an upward direction to prevent injury to their shovels.

The inner ends of the angularly disposed members 26 are spaced from each other as will be seen from the drawings, and these members are each provided with a fender 52 of suitable form.

Any suitable means may be employed for operating the fenders to move them toward or away from each other.

What is claimed is:

1. In a cotton chopper, the combination with a frame, of depending members carried by the frame, shafts journaled in the members, wheels carried by the shafts, a supplemental frame mounted upon one of the shafts for rocking movement thereupon, a forwardly and rearwardly extending shaft journaled in the supplemental frame, connections between the forwardly and rearwardly extending shaft and the adjacent wheeled shaft for simultaneous rotation thereof, chopping hoes carried by the rearward portion of the forwardly and rearwardly extending shaft, and means for rocking the supplemental frame upon its shaft to bring the chopping hoes into and out of operative position.

2. In a machine of the class described, the combination with a horizontal frame, of depending members carried by the frame, a transverse wheeled shaft mounted in each of the depending members, a supplemental transversely extending frame mounted upon one of the wheeled shafts for rocking movement thereupon, a longitudinal shaft mounted in the inner portion of the rocking frame, operative connections between the longitudinal shaft and the adjacent wheeled shaft, chopping hoes connected with the rearward end of the longitudinal shaft, said hoes being arranged for movement into and out of operative position when the supplemental frame is rocked, a lever mounted upon the first named frame, and connections between the lever and the supplemental frame for movement of the frame upon its shaft when the lever is moved.

In testimony whereof I affix my signature, in presence of two witnesses.

WILLARD A. RUSH.

Witnesses:
R. S. VAN DYKE,
W. H. ENNIS.